US008847854B2

(12) United States Patent
Oki et al.

(10) Patent No.: US 8,847,854 B2
(45) Date of Patent: Sep. 30, 2014

(54) NON-SPECTACLED STEREOSCOPIC DISPLAY APPARATUS CAPABLE OF IMPROVING OPTICAL CHARACTERISTICS

(71) Applicant: Stanley Electric Co., Ltd., Tokyo (JP)

(72) Inventors: Yoji Oki, Yokohama (JP); Yasuo Toko, Machida (JP); Masatsuna Sawada, Kumagaya (JP)

(73) Assignee: Stanley Electric Co., Ltd., Tokyo (JP)

( * ) Notice: Subject to any disclaimer, the term of this patent is extended or adjusted under 35 U.S.C. 154(b) by 9 days.

(21) Appl. No.: 13/846,783

(22) Filed: Mar. 18, 2013

(65) Prior Publication Data

US 2013/0249961 A1   Sep. 26, 2013

(30) Foreign Application Priority Data

Mar. 22, 2012 (JP) ................. 2012-065111

(51) Int. Cl.
| | |
|---|---|
| *G09G 3/00* | (2006.01) |
| *H04N 13/04* | (2006.01) |
| *G02B 27/22* | (2006.01) |
| *G09G 5/14* | (2006.01) |
| *G02B 5/04* | (2006.01) |

(52) U.S. Cl.
CPC ............. *G09G 5/14* (2013.01); *H04N 13/0418* (2013.01); *G02B 27/2214* (2013.01); *G02B 5/045* (2013.01)
USPC .............................................. 345/32; 345/87

(58) Field of Classification Search
USPC ............................. 345/32, 87, 204, 690, 7, 8
See application file for complete search history.

(56) References Cited

U.S. PATENT DOCUMENTS

| | | | |
|---|---|---|---|
| 2012/0242931 A1* | 9/2012 | Jung et al. ................. | 349/62 |
| 2013/0027366 A1* | 1/2013 | Oki et al. ................... | 345/204 |
| 2013/0093968 A1* | 4/2013 | Yanal ......................... | 349/15 |

FOREIGN PATENT DOCUMENTS

| | | |
|---|---|---|
| JP | 2010-262198 A | 11/2010 |
| JP | 2010-286813 A | 12/2010 |
| JP | 2012-133128 A | 7/2012 |

* cited by examiner

*Primary Examiner* — Ricardo L Osorio
(74) *Attorney, Agent, or Firm* — Holtz Holtz Goodman & Chick PC

(57) ABSTRACT

A non-spectacled stereoscopic display apparatus includes a light guide plate, first and second light sources, a single-face prism sheet, a transmissive display panel, a synchronous drive circuit adapted to synchronize the first and second light sources to display parallax images on the transmissive display panel, a phase difference plate, and an optically-modulating structure adapted to receive light emitted from the phase difference plate. The optically-modulating structure includes first and second transparent substrates, a prism array provided on the first transparent substrate, a first transparent electrode layer, a second transparent electrode layer, a liquid crystal layer, and first and second alignment layers for performing an aligning process upon liquid crystal molecules of the liquid crystal layer. The phase difference plate is adapted to rotate a main polarization angle of the single-face prism sheet by a predetermined angle to coincide with an aligning direction of the liquid crystal layer.

9 Claims, 18 Drawing Sheets

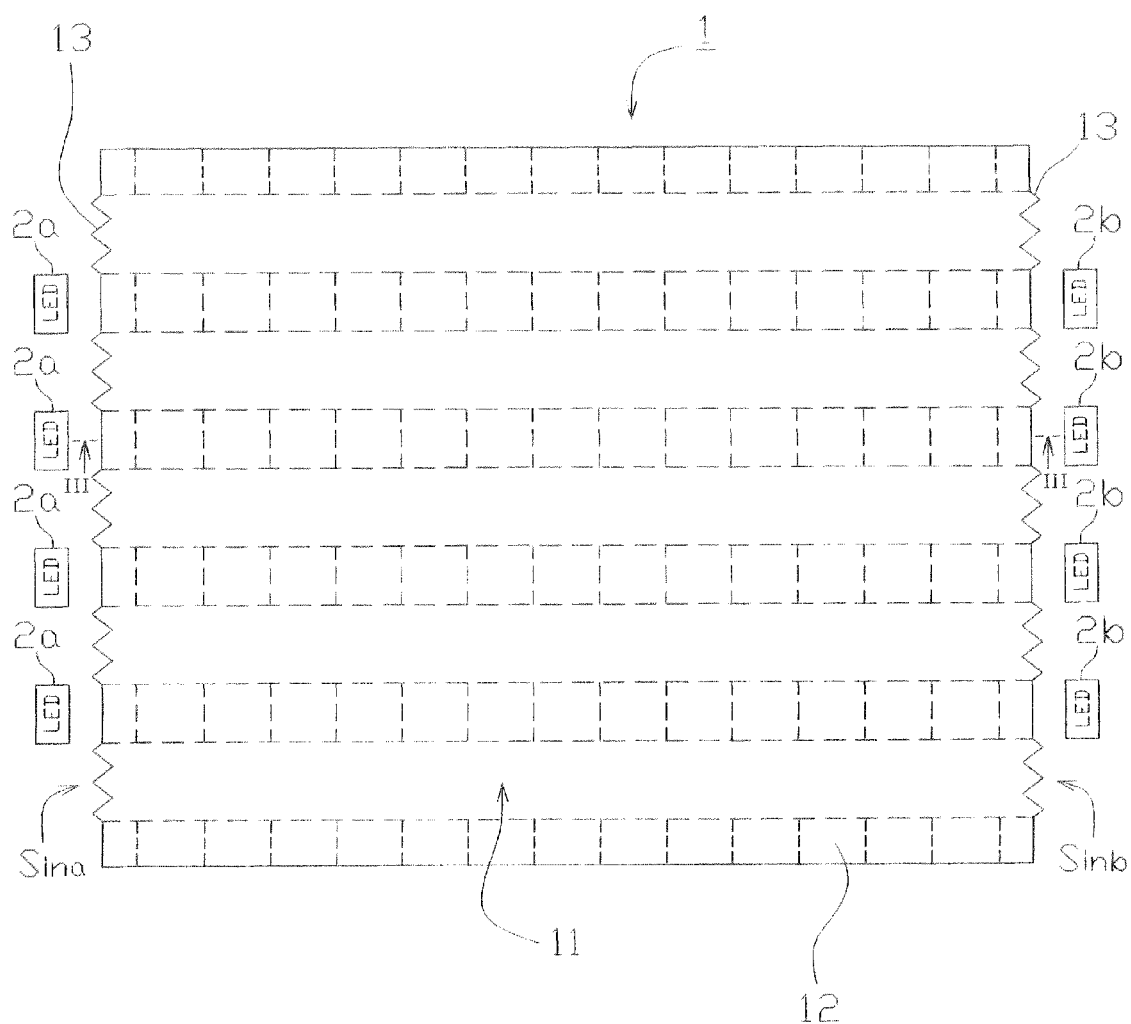

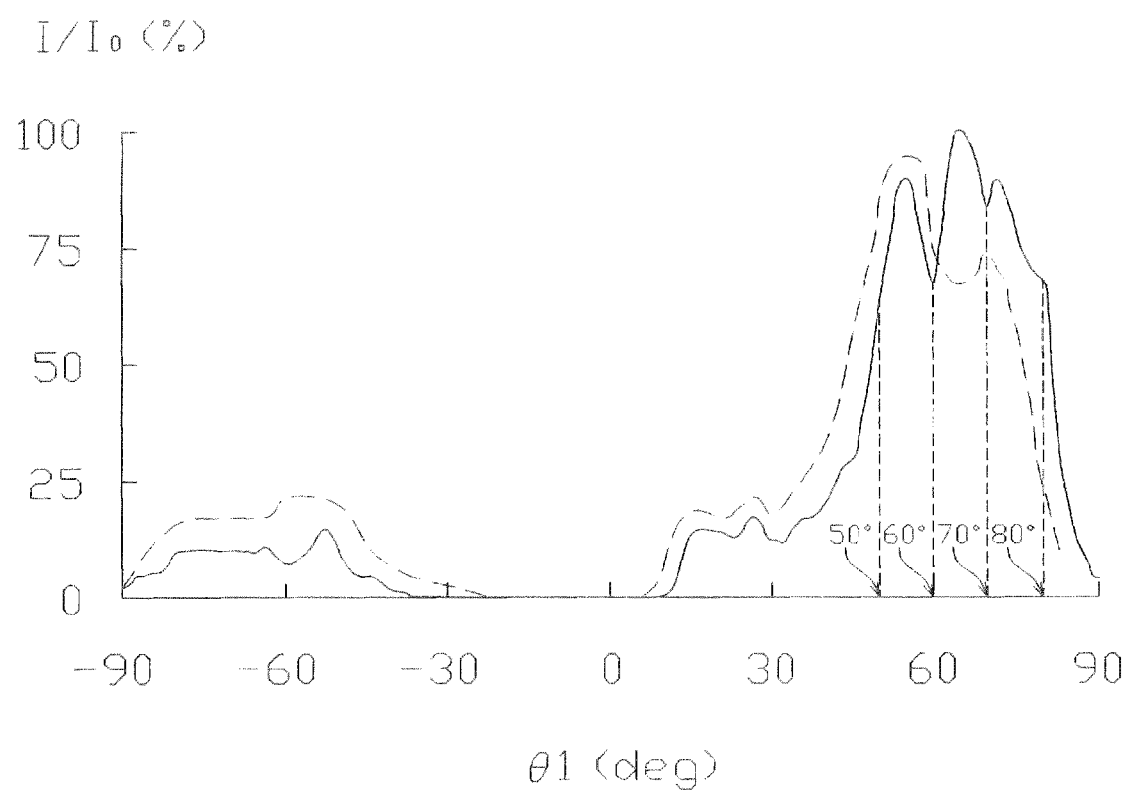

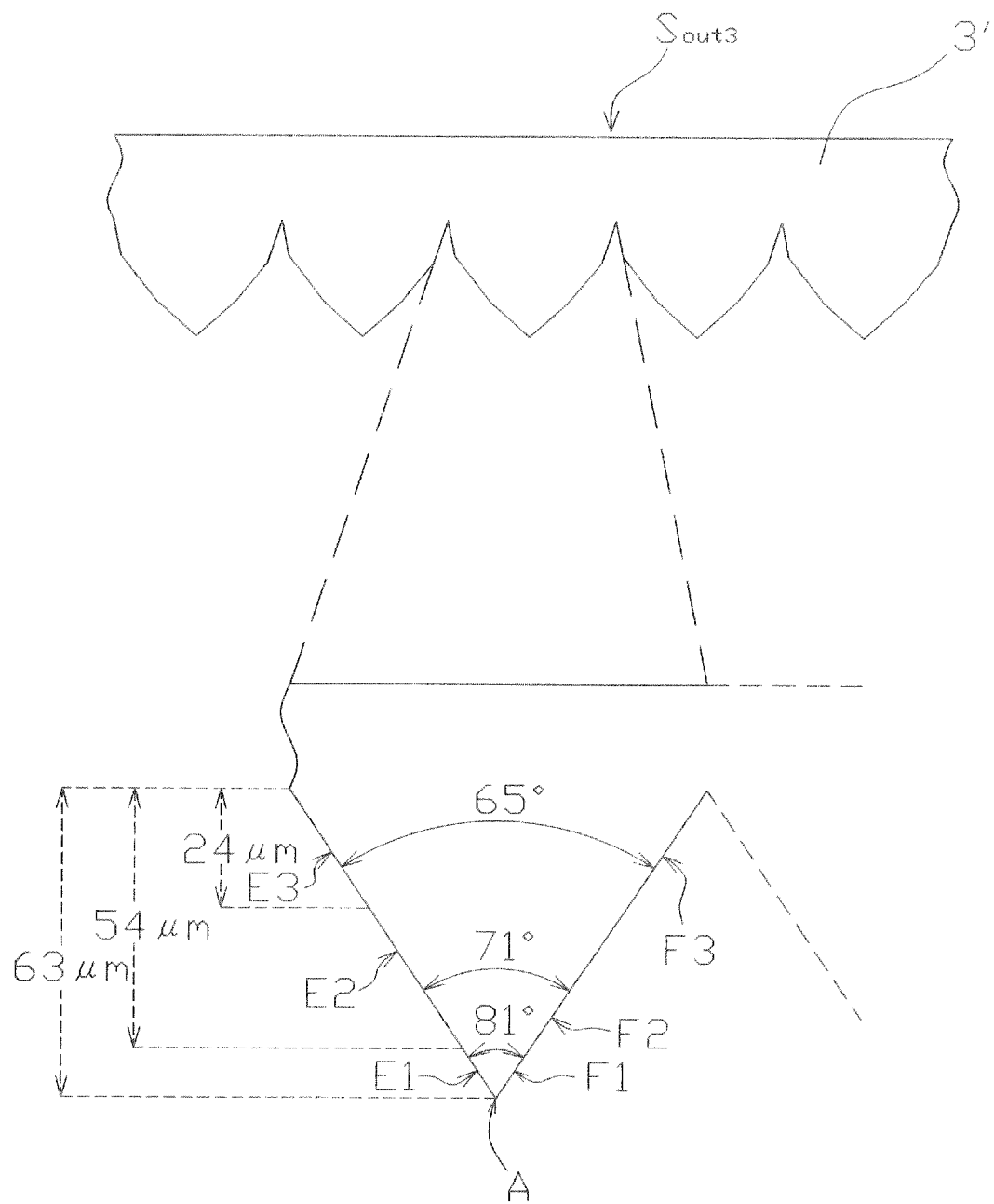

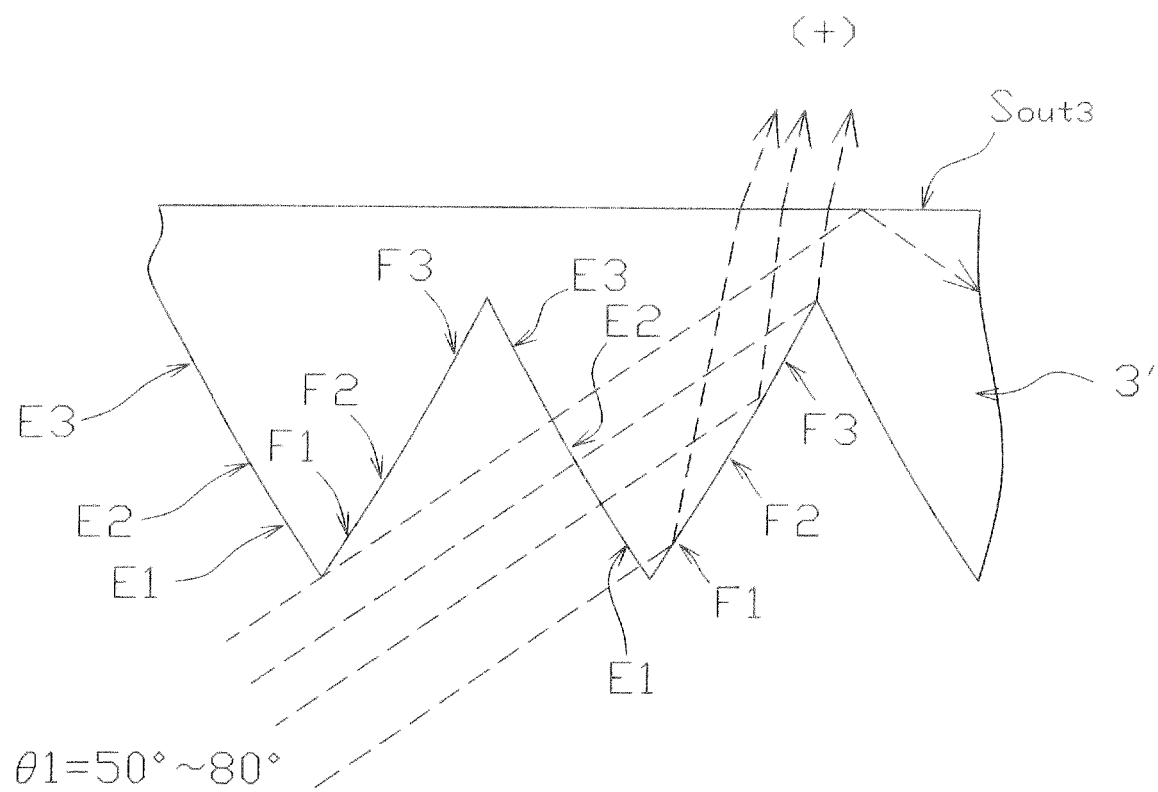

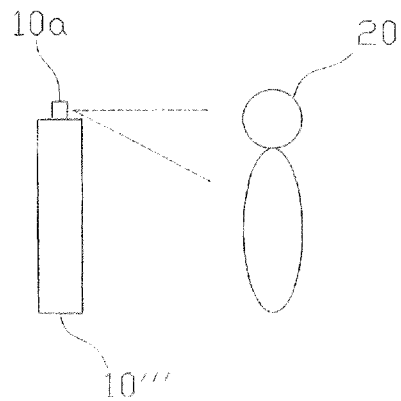
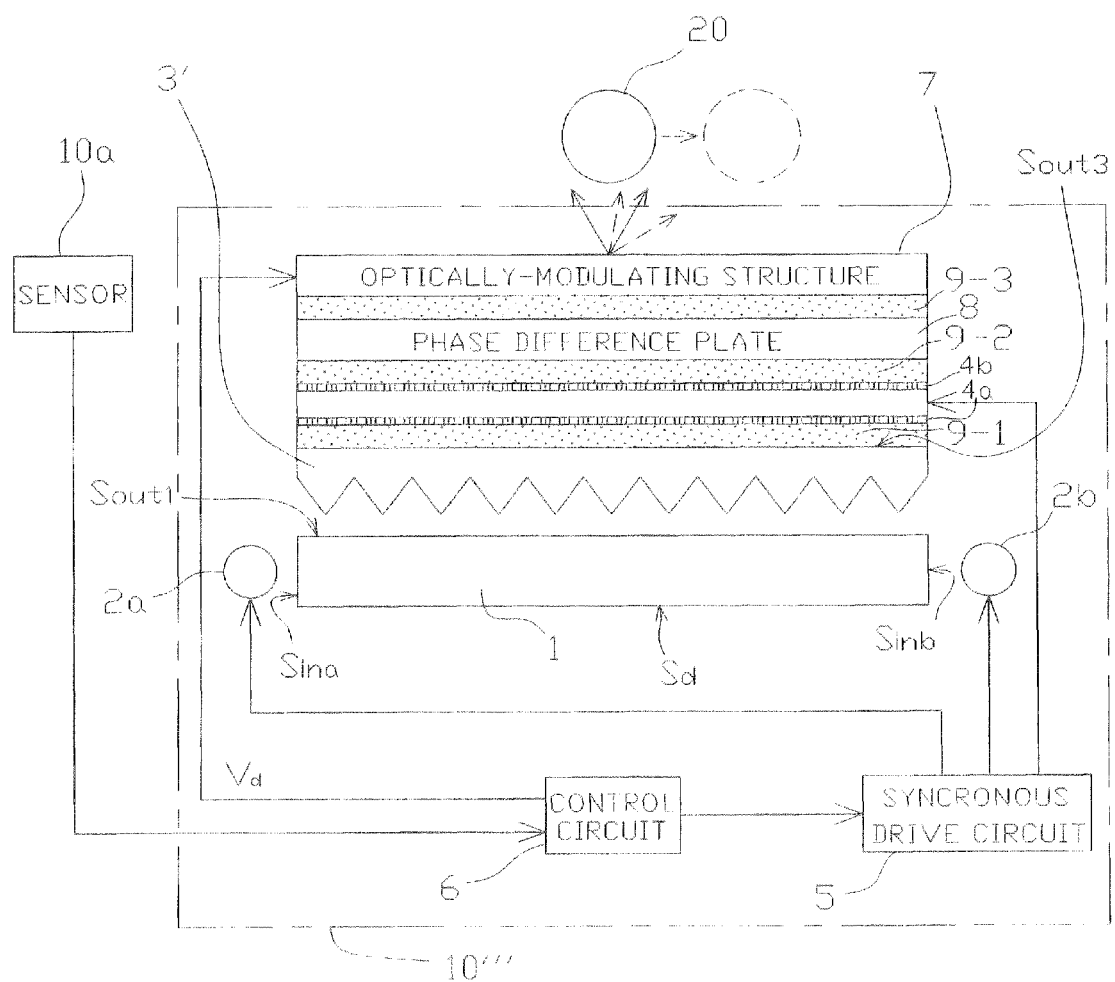

NON-SPECTACLED STEREOSCOPIC DISPLAY APPARATUS CAPABLE OF IMPROVING OPTICAL CHARACTERISTICS

This application claims the priority benefit under 35 U.S.C. §119 to Japanese Patent Application No. JP2012-065111 filed on Mar. 22, 2012, which disclosure is hereby incorporated in its entirety by reference.

BACKGROUND

1. Field

The presently disclosed subject matter relates to a non-spectacled stereoscopic display apparatus.

2. Description of the Related Art

Generally, a stereoscopic display apparatus provides parallax images from viewpoints of both eyes of a viewer. The stereoscopic display apparatus is classified into the spectacled type and the non-spectacled type. The spectacled type stereoscopic display apparatus needs specific glasses, while the non-spectacled type stereoscopic display apparatus needs no specific glasses.

FIG. 17A is a schematic view illustrating a prior art non-spectacled stereoscopic display apparatus, and FIG. 17B is a detailed view of the stereoscopic display apparatus of FIG. 17A (see: JP2010-262198A).

In FIG. 17A, reference numeral 10 designates a non-spectacled stereoscopic display apparatus, and 20 designates a viewer.

In FIG. 17B, the viewer 20 is located in front of a center of a display image of the stereoscopic display apparatus 10.

In FIG. 17B, the stereoscopic display apparatus 10 is constructed by a light guide plate 1 with a light distributing face $S_d$ and a light emitting face $S_{out1}$, two light sources 2a and 2b disposed on light incident faces $S_{ina}$ and $S_{inb}$ of the light guide plate 1, a single-face-deformed triangular prism sheet 3 disposed on the light emitting face $S_{out1}$ of the light guide plate 1, a transmissive liquid crystal display panel 4 disposed on a light emitting face $S_{out3}$ of the single-face-deformed triangular prism sheet 3, and a synchronous drive circuit 5 for synchronizing the light sources 2a and 2b to display parallax images on the transmissive liquid crystal display panel 4. When one of the light sources 2a and 2b is turned ON, the single-face-deformed triangular prism sheet 3 is configured to emit light to one eye of the viewer with no emission of light to the other eye. Also, provided on the light incident and light emission sides, respectively, of the transmissive liquid crystal display panel 4 are polarizing plates 4a and 4b. Thus, a stereoscopic image with the same number of pixels as that of the transmissive liquid crystal display panel 4 can be displayed.

In FIG. 17B, two light guide plates, i.e., a lower light guide plate and an upper light guide plate superposed onto the lower light guide plate can be provided instead of the light guide plate 1 (see: JP2010-286813A).

In FIG. 17B, when the viewer 20 is moved along the right or left direction as indicated by a dotted line, it is impossible to universally move the location of a stereoscopic image toward the viewer 20.

FIG. 18A is a schematic view illustrating a non-spectacled stereoscopic display apparatus which was already suggested by the inventors of this patent application, and FIG. 18B is a detailed view of the stereoscopic display apparatus of FIG. 18A (see: Japanese Patent Application No. 2010-285192 filed on Dec. 21, 2010, and laid open as Japanese Patent Publication No. JP2012-133128A on Jul. 12, 2012).

In FIG. 18A, the stereoscopic display apparatus 10 of FIG. 17A is replaced by a stereoscopic display apparatus 10' associated with a sensor 10a for detecting the location of the viewer 20.

In the stereoscopic display apparatus 10' of FIG. 18B, an optically-modulating structure 7 including a microprism liquid crystal element is added to the elements of the stereoscopic display apparatus 10 of FIG. 17A. As a result, the control circuit 6 receives a signal indicating the location of the viewer 20 to transmit a drive voltage $V_d$ to the optically-modulating structure 7, which will be later explained in detail. For example, when the viewer 20 is moved along the right or left direction as indicated by a dotted line, the control circuit 6 receives the sense signal of the sensor 10a to transmit the drive voltage $V_d$ to the optically-modulating structure 7, so that the location of a stereoscopic image is moved toward the viewer 20.

In the stereoscopic display apparatus 10' of FIG. 18B, however, since the main polarization direction of the light emitted from the single-face-deformed triangular prism sheet 3 does not always match with the polarizing axis of the optically-modulating structure 7 for moving the stereoscopic image, the optical characteristics would be degraded.

Also, since the location of the transmissive liquid crystal display panel 4 is centered at the display image of the apparatus and the optically-modulating structure 7 changes its optical axis within a few degrees to 20 degrees, the optically-modulating structure 7 needs two distinct modulating structures for the right direction and the left direction, respectively, of motion of the viewer 20, which would require a complex configuration of the optically-modulating structure 7.

Further, since an air gap G1 is present between the light guide plate 1 and the single-face-deformed triangular prism sheet 3, an air gap G2 is present between the single-face-deformed triangular prism sheet 3 and the transmissive liquid crystal display panel 4, and an air gap G3 is present between the transmissive liquid crystal display panel 4 and the optically-modulating structure 7, large differences are generated in refractive indexes among them, which also would degrade the optical characteristics.

SUMMARY

The presently disclosed subject matter seeks to solve one or more of the above-described problems.

According to the presently disclosed subject matter, a non-spectacled stereoscopic display apparatus includes: a light guide plate having a light distributing face, a light emitting face opposing the light distributing face, and first and second light incident faces opposing each other on sides of the light distributing face and the light emitting face; first and second light sources disposed on the first and second light incident faces, respectively, of the light guide plate; a single-face prism sheet including prisms arranged along one direction disposed on the light emitting face of the light guide plate; a transmissive display panel disposed on a light emitting face of the single-face prism sheet; a synchronous drive circuit adapted to synchronize the first and second light sources to display parallax images on the transmissive display panel; a phase difference plate; and an optically-modulating structure adapted to receive light emitted from the phase difference plate. The optically-modulating structure includes: first and second transparent substrates opposing each other; a prism array provided on the first transparent substrate; a first transparent electrode layer provided on the prism array; a second transparent electrode layer provided on the second transparent substrate; a liquid crystal layer provided between the first and second transparent substrates; and first and second alignment layers provided on the first and second transparent substrates, respectively, for performing an aligning process upon liquid crystal molecules of the liquid crystal layer. The phase difference plate is adapted to rotate a main polarization angle of the single-face prism sheet by a predetermined angle to coincide with an aligning direction of the liquid crystal layer.

Since the main polarization angle of the single-face prism sheet is made to coincide with the aligning direction of the liquid crystal layer of the optically-modulating structure by the phase difference plate, the amount of light of a stereoscopic image can be increased to improve the optical characteristics.

BRIEF DESCRIPTION OF THE DRAWINGS

The above and other advantages and features of the presently disclosed subject matter will be more apparent from the following description of certain embodiments, taken in conjunction with the accompanying drawings, as compared with the prior art, wherein:

FIG. 2 is a plan view illustrating an example of the light guide plate of FIG. 1B;

FIG. 4 is a graph illustrating a left-eye light distribution of the light guide plate of FIG. 1B when the left-eye light source is turned ON;

FIG. 5 is a view illustrating one prism of the single-face-deformed triangular prism sheet of FIG. 1B;

FIG. 6 is a view illustrating optical paths within the single-face-deformed triangular prism sheet of FIG. 5;

FIG. 8 is a graph illustrating a left-eye light distribution of the single-face-deformed triangular prism sheet of FIG. 1B when the left-eye light source is turned ON;

FIG. 16A is a schematic view illustrating a modification of the non-spectacled stereoscopic display apparatus of FIG. 1A;

FIG. 16B is a detailed view of the stereoscopic display apparatus of FIG. 16A;

DETAILED DESCRIPTION OF EXEMPLARY EMBODIMENTS

Figure 1A:
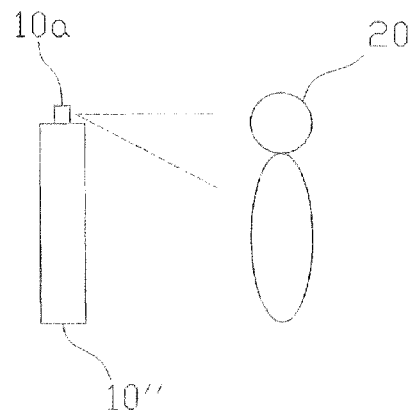
FIG. 1A is a schematic view illustrating an embodiment of the non-spectacled stereoscopic display apparatus according to the presently disclosed subject matter.
Figure 1B:
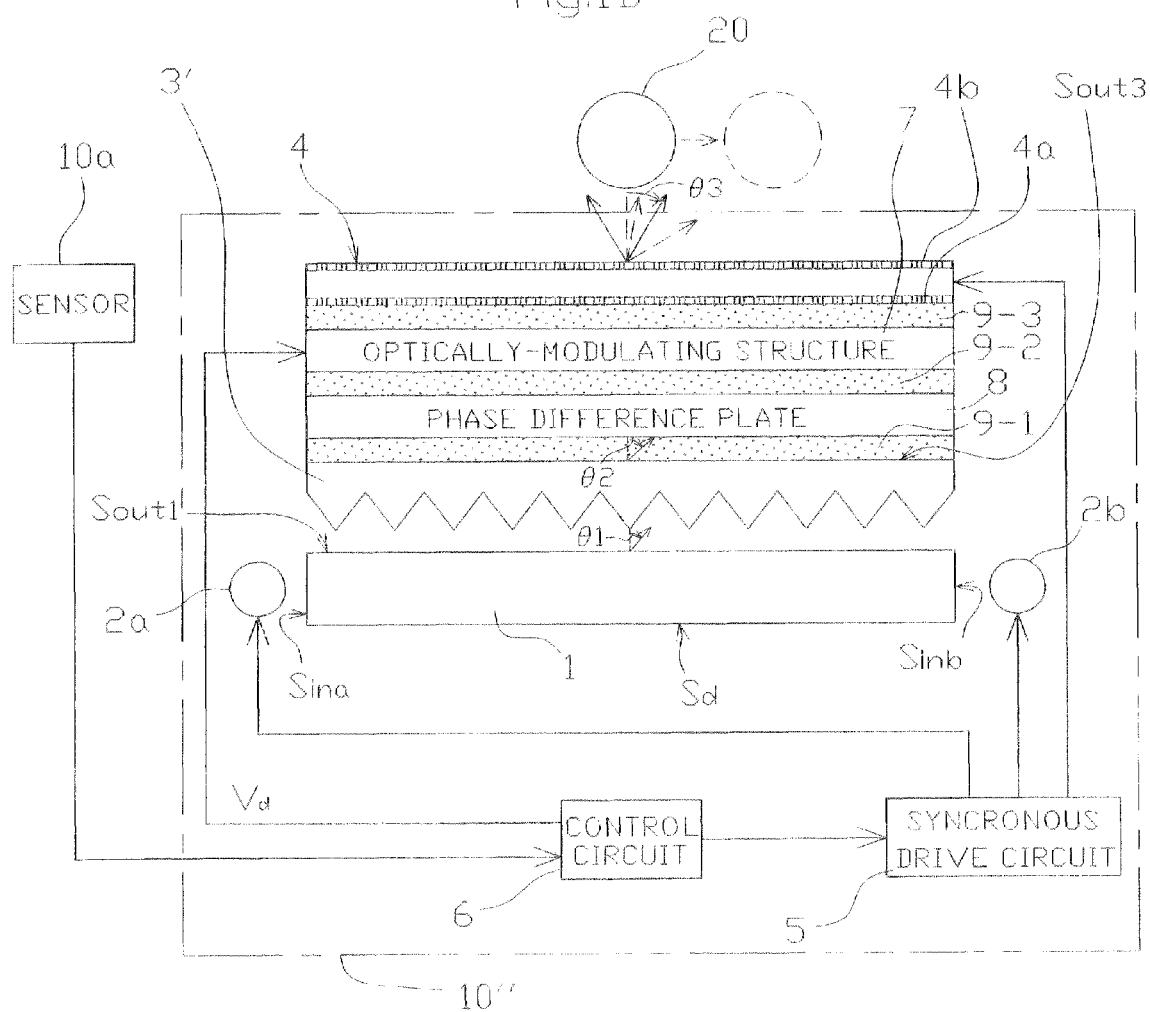
FIG. 1B is a detailed view of the stereoscopic display apparatus of FIG. 1A.

FIG. 1A is a schematic view illustrating an embodiment of the non-spectacled stereoscopic display apparatus according to the presently disclosed subject matter, and FIG. 1B is a detailed view of the stereoscopic display apparatus of FIG. 1A.

Figure 18A:
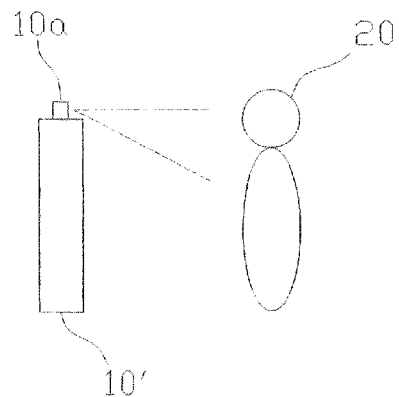
FIG. 18A is a schematic view illustrating a non-spectacled stereoscopic display apparatus which was already suggested by the inventors of this application.

In FIG. 1A, the stereoscopic display apparatus 10' of FIG. 18A is replaced by a stereoscopic display apparatus 10" associated with the sensor 10a for detecting the location of the viewer 20.

Figure 18B:
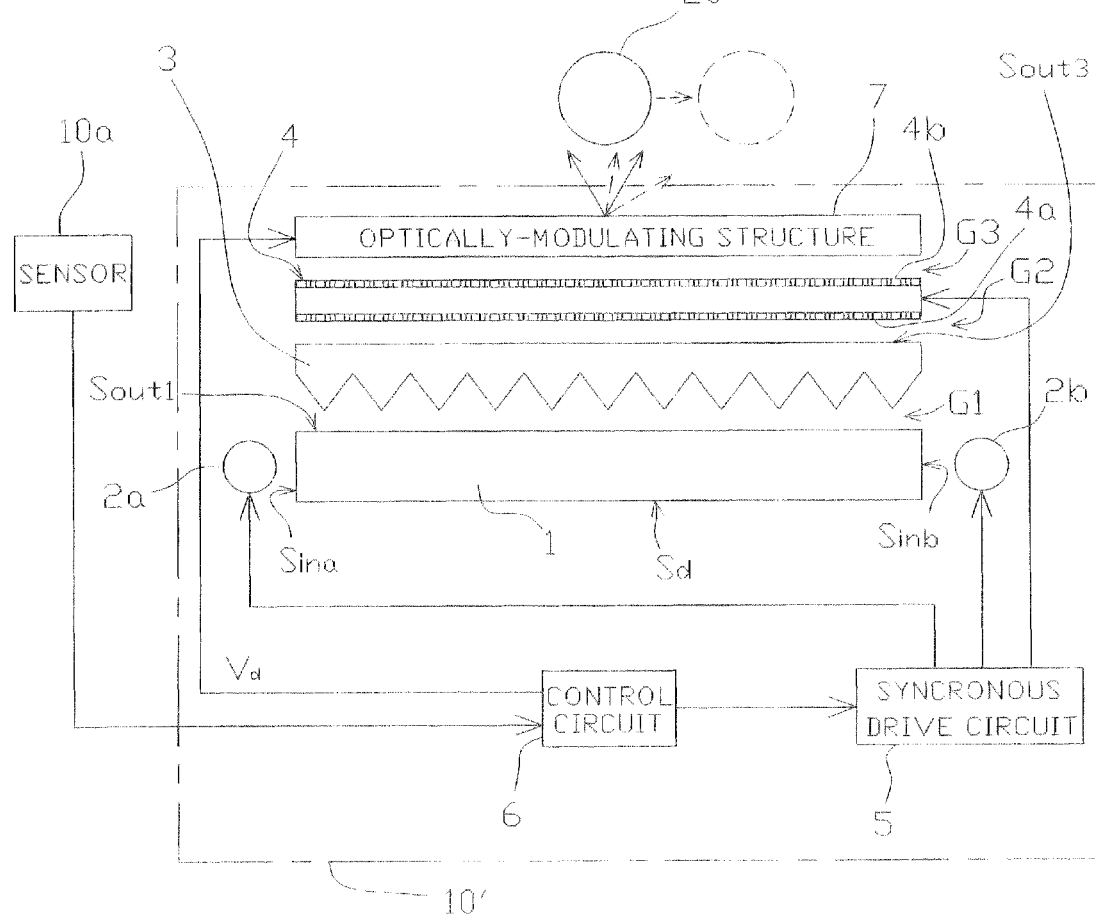
FIG. 18B is a detailed view of the stereoscopic display apparatus of FIG. 18A.

In the stereoscopic display apparatus 10" of FIG. 1B, the single-face-deformed triangular prism sheet 3 of FIG. 18B is replaced by a single-face-deformed triangular prism sheet 3'. Also, the optically-modulating structure 7 of FIG. 18B is moved from the upper side of the transmissive liquid crystal display panel 4 to the lower side thereof. Further, a phase difference plate 8 is inserted between the single-face-deformed triangular prism sheet 3' and the optically-modulating structure 7, in order to rotate a main polarization angle of the single-face-deformed triangular prism sheet 3' to coincide with the alignment direction of a liquid crystal layer of the optically-modulating structure 7. Furthermore, a contact layer 9-1 is inserted between the single-face-deformed triangular prism sheet 3' and the phase difference plate 8, a contact layer 9-2 is inserted between the phase difference plate 8 and the optically-modulating structure 7, and a contact layer 9-3 is inserted between the optically-modulating structure 7 and the transmissive liquid crystal display panel 4.

Each portion of the stereoscopic display apparatus 10" of FIG. 1B will be explained below.

In FIG. 2, which illustrates an example of the light guide plate 1 of FIG. 1B, the light guide plate 1 is made of a transmissive material such as acryl resin or polycarbonate resin. The light guide plate 1 is symmetrical with respect to a center face between the light incident faces $S_{ina}$ and $S_{inb}$.

A plurality of flat mirror finishing portions 11 are provided on the light distributing face $S_d$ of the light guide plate 1 and extend between the light incident face $S_{ina}$ and the light incident face $S_{inb}$. The flat mirror finishing portions 11 serve as means for spreading light to the inner part of the light guide plate 1. A plurality of triangular prism sequences 12 are provided on areas of the light distributing face $S_d$ of the light guide plate 1 where the flat mirror finishing portions 11 are not provided. Each of the triangular prism sequences 12 includes a plurality of equidistantly-arranged triangular prisms for bending the path of light. Embossed portions 13 such as triangular-shaped portions, circular portions or microlens-shaped portions are provided at the light incident faces $S_{ina}$ and $S_{inb}$ on the sides of the flat mirror finishing portions 11, in order to suppress returning light.

Each of the light sources 2a and 2b can be formed by one or more light emitting diodes (LEDs).

In FIG. 2, the width of each of the light sources 2a and 2b is the same as that of each of the triangular prism sequences 12. In this case, the nearer to the light sources 2a and 2b one prism face of the triangular prism sequences 12, the larger the amount of light totally-reflected by that prism face. Therefore, the emitted light from the light guide plate 1 is not uniform along the triangular prism sequences 12 per one width of the light sources 2a and 2b and depends upon the magnitude of the stereoscopic display apparatus of FIG. 1B and the required uniformity of face luminous intensity.

Figure 3A:
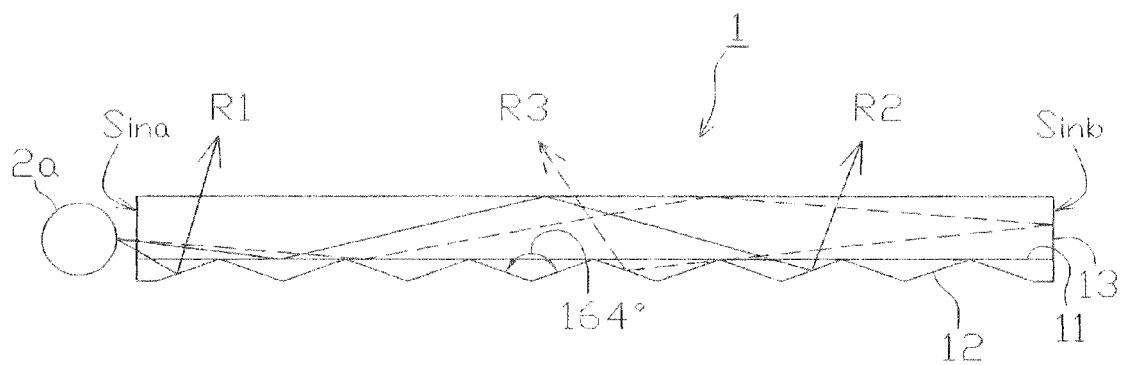
FIGS. 3A and 3B are cross-sectional views taken along the line III-III in FIG. 2.
Figure 3B:
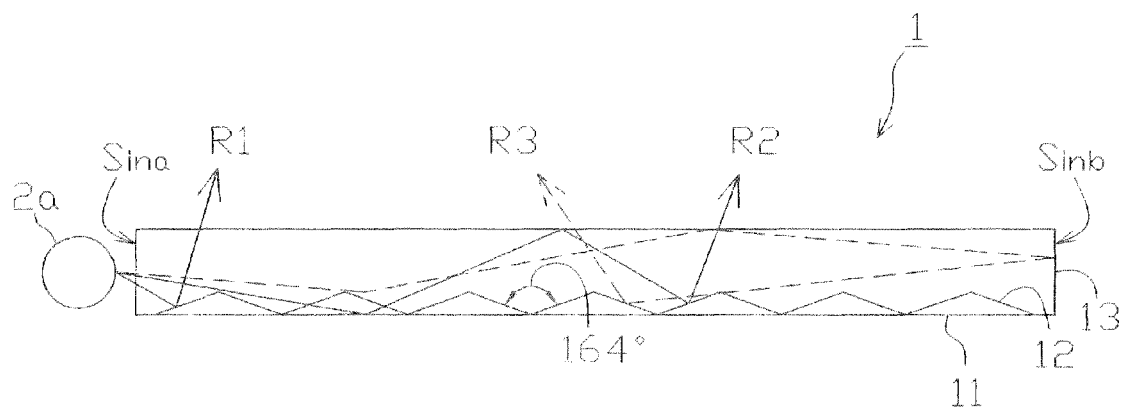

FIGS. 3A and 3B are cross-sectional views taken along the line III-III in FIG. 2.

As illustrated in FIG. 3A, the triangular prism sequences 12 may be protruded from the flat mirror finishing portions 11. Also, as illustrated in FIG. 3B, the flat mirror finishing portions 11 may be protruded from the triangular prism sequences 12. In FIGS. 3A and 3B, the light sources 2a and 2b are turned ON and OFF, respectively; however, since the light sources 2a and 2b are symmetrically located with the center thereof, when the light sources 2a and 2b are turned OFF and ON, respectively, similar operations can be carried out.

In FIGS. 3A and 3B, light R1 as indicated by a solid line from the light source 2a is totally-reflected by one prism face of the triangular prism sequences 12, and then, is emitted from the light guide plate 1. Also, light R2 as indicated by another solid line from the light source 2a is totally-reflected by the flat mirror finishing portions 11, and then, is totally-reflected by one prism face of the triangular prism sequences 12. Finally, the light R2 is emitted from the light guide plate 1. Thus, the lights R1 and R2 are emitted at a (+) angle direction of the light guide plate 1 and are, therefore, provided for a left-eye parallax image.

In FIGS. 3A and 3B, if the embossed portions 13 are absent, light R3 as indicated by a dotted line from the light source 2a is totally-reflected by the flat mirror finishing portions 11, and then becomes returning light at the light incident face $S_{inb}$. Then, the light R3 is totally-reflected by one prism face of the triangular prism sequences 12. Finally, the light R3 is emitted from the light guide plate 1. Thus, the returning light R3 is emitted at a (−) angle direction of the light guide plate 1 and is, therefore, not provided for a left-eye parallax image. Note that, such light R3 is irregularly-reflected by the embossed portion 13 to prevent the light R3 from being emitted from the light guide plate 1.

Since the prisms of the triangular prism sequences 12 are required to receive light from both of the light sources 2a and 2b, each of the prisms has a cross section of an isosceles triangle with a large apical angle such as 164°. Also, the prisms are equidistantly arranged in the triangular prism sequences 12. Note that a larger apical angle of the isosceles triangle would suppress the returning light while decreasing the amount of light going in the up direction.

In FIG. 4, which illustrates a left-eye light distribution of the light guide plate 1 when the light source 2a is turned ON, a solid line indicates a left-eye light distribution where the embossed portions 13 are present, and a dotted line indicates a left-eye light distribution where the embossed portions 13 are absent. In FIG. 4, I is a luminous intensity at the light emitting face $S_{out1}$ of the light guide plate 1, and $I_0$ is a maximum value of the luminous intensity I.

As indicated by the solid line in FIG. 4, when the emitted angle θ1 is 0° to −90°, the relative luminous intensity $I/I_0$ is weakened by suppressing the returning light R3 of FIGS. 3A and 3B using the embossed portions 13. Therefore, the right-eye parallax image is not affected which decreases the crosstalk between the right-eye parallax image and the left-eye parallax image. In FIG. 4, the relative luminous intensity $I/I_0$ is strong when the emitted angle θ1 is +50° to +80°. Particularly, the relative luminous intensity $I/I_0$ is maximum when the emitted angle θ1 is +64°.

Note that, when the light source 2b is turned ON, the relative luminous intensity $I/I_0$ is weakened by suppressing the returning light R3 of FIGS. 3A and 3B using the embossed portions 13, when the emitted angle θ1 is 0° to +90°. Therefore, the left-eye parallax image is not affected which decreases the crosstalk between the right-eye parallax image and the left-eye parallax image. Also, the relative luminous intensity $I/I_0$ is strong when the emitted angle θ1 is −50° to −80°. Particularly, the relative luminous intensity $I/I_0$ is maximum when the emitted angle θ1 is −64°.

Thus, the left-eye light distribution and the right-eye light distribution of the light guide plate 1 are symmetrical with respect to θ1=0°.

In FIG. 5, which illustrates one prism of the single-face-deformed triangular prism sheet 3' of FIG. 1B, this prism is a deformed triangular prism such as a three-step triangular prism which has side portions E1 and F1 at a distance of 0 μm to 9 μm from an arris A with an apical angle of 81°, side portions E2 and F2 at a distance of 9 μm to 39 μm from the arris A with an apical angle of 71°, and side portions E3 and F3 at a distance of 39 μm to 63 μm from the arris A with an apical angle of 65°. This single-face-deformed triangular prism sheet 3' can precisely be manufactured by a mold stamper.

In FIG. 6, which illustrates optical paths within the single-face-deformed triangular prism sheet 3' of FIG. 5, light emitted from the light emitting face $S_{out1}$ of the light guide plate 1 is refracted at the side portions E1, E2 and E3, and then, is totally-reflected at the side portions F1, F2 and F3. Finally, the light is emitted from the light emitting face $S_{out3}$ of the single-face-deformed triangular prism sheet 3'.

The optical paths within the single-face-deformed triangular prism sheet 3' when the emitted angle θ1 of the light guide plate 1 is 50°, 60°, 70° and 80°, respectively, will be explained in detail below.

Figure 7A:
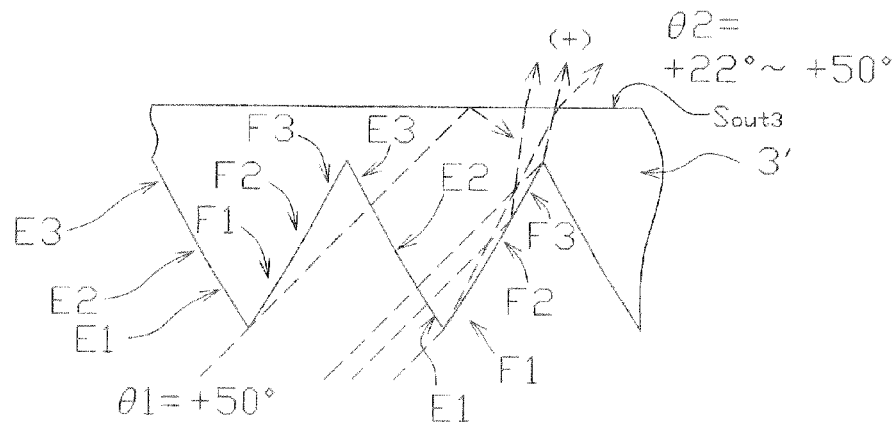
FIGS. 7A, 7B, 7C and 7D are views illustrating optical paths within the single-face-deformed triangular prism sheet of FIG. 5, when the emitted angle θ1 of the light guide plate is +50°, +60°, +70° and +80°, respectively.

As illustrated in FIG. 7A, when the emitted angle θ1 of the light guide plate 1 is +50°, light emitted from the light emitting face $S_{out1}$ of the light guide plate 1 is refracted at the side portions E1, E2 and E3, and then, is totally-reflected at the side portions F1, F2 and F3. Finally, the light is emitted from the light emitting face $S_{out3}$ of the single-face-deformed triangular prism sheet 3' at an emitted angle θ2 of +22° to +50°.

Figure 7B:
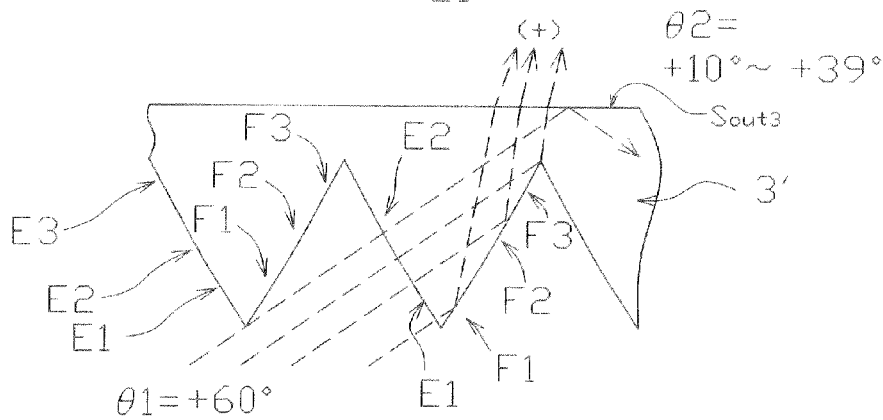

As illustrated in FIG. 7B, when the emitted angle θ1 of the light guide plate 1 is +60°, light emitted from the light emitting face $S_{out1}$ of the light guide plate 1 is refracted at the side portions E1 and E2, and then, is totally-reflected at the side portions F1, F2 and F3. Finally, the light is emitted from the light emitting face $S_{out3}$ of the single-face-deformed triangular prism sheet 3' at an emitted angle θ2 of +10° to +39°.

Figure 7C:
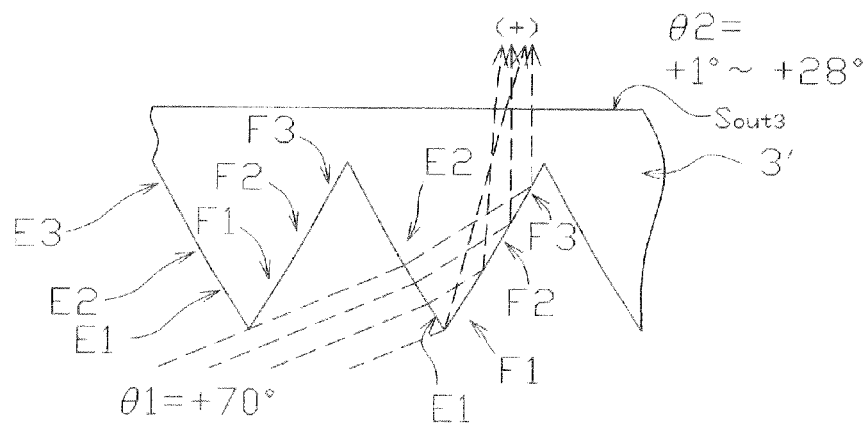

As illustrated in FIG. 7C, when the emitted angle θ1 of the light guide plate 1 is +70°, light emitted from the light emitting face $S_{out1}$ of the light guide plate 1 is refracted at the side portions E1 and E2, and then, is totally-reflected at the side portions F1, F2 and F3. Finally, the light is emitted from the light emitting face $S_{out3}$ of the single-face-deformed triangular prism sheet 3' at an emitted angle θ2 of +1° to +28°.

Figure 7D:
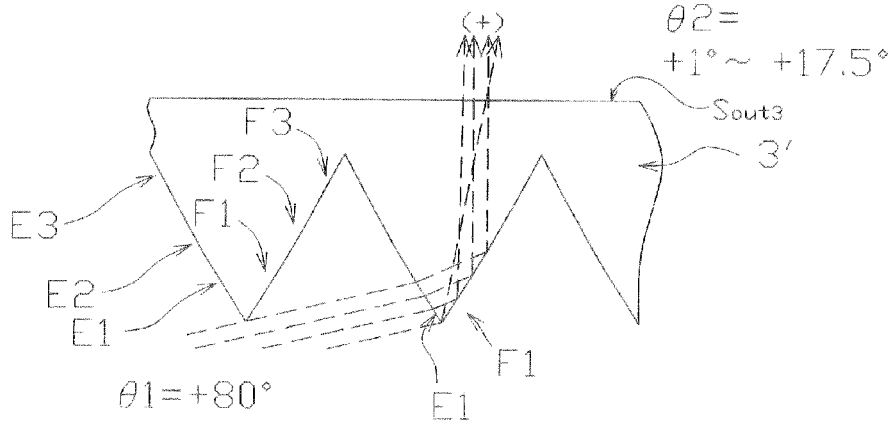

As illustrated in FIG. 7D, when the emitted angle θ1 of the light guide plate 1 is +80°, light emitted from the light emitting face $S_{out1}$ of the light guide plate 1 is refracted at the side portion E1, and then, is totally-reflected at the side portion F1. Finally, the light is emitted from the light emitting face $S_{out3}$ of the single-face-deformed triangular prism sheet 3' at an emitted angle θ2 of +1° to +17.5°.

Note that, when the emitted angle θ1 of the light guide plate 1 is 0° (vertical) to 50°, light emitted from the light guide plate 1 is refracted at the side portions E1, E2 and E3; however, the light is totally-reflected by the light emitting face $S_{out3}$ of the single-face-deformed triangular prism sheet 3' due to the light angle at the light emitting face $S_{out3}$ larger than the critical angle. Thus, the light hardly penetrates the single-face-deformed triangular prism sheet 3'.

Figure 8:
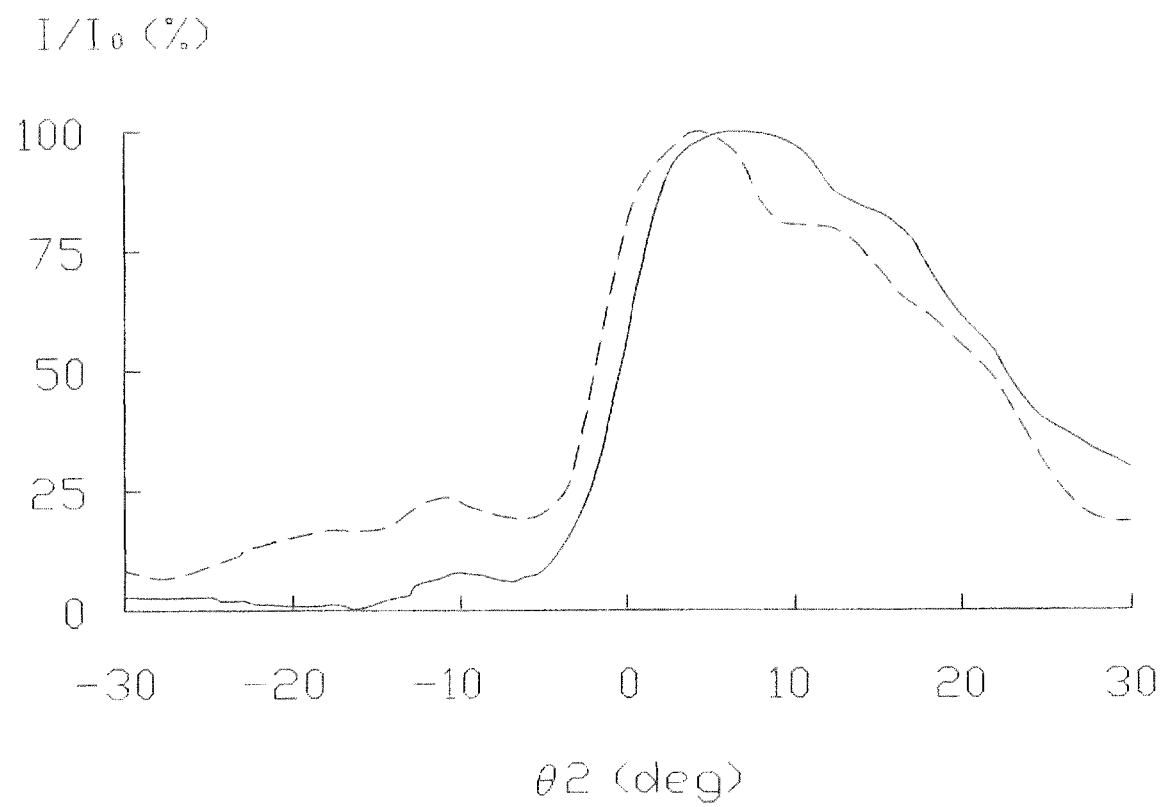

In FIG. 8, which illustrates a left-eye light distribution of the single-face-deformed triangular prism sheet 3' when the light source 2a is turned ON, a solid line indicates a left-eye light distribution where the embossed portions 13 are present, and a dotted line indicates a left-eye light distribution where the embossed portions 13 are absent. In FIG. 8, I is a luminous intensity at the light emitting face $S_{out3}$ of the single-face-deformed triangular prism sheet 3', and $I_0$ is a maximum value of the luminous intensity I.

As indicated by the solid line in FIG. 8, when the emitted angle θ2 of the single-face-deformed triangular prism sheet 3' is 0° to −30°, the relative luminous intensity $I/I_0$ is weakened by suppressing the returning light R3 of FIG. 3 using the embossed portions 13. Therefore, the right-eye parallax image is not affected which decreases the crosstalk between the right-eye parallax image and the left-eye parallax image. In FIG. 8, the relative luminous intensity $I/I_0$ is strong when the emitted angle θ2 is 0° to +30°, while the relative luminous intensity $I/I_0$ is very weak when the emitted angle θ2 is 0° to −30°.

Note that, when the light source 2b is turned ON, the relative luminous intensity $I/I_0$ is weakened by suppressing the returning light R3 of FIGS. 3A and 3B using the embossed portions 13, when the emitted angle θ2 is 0° to +30°. Therefore, the left-eye parallax image is not affected which decreases the crosstalk between the right-eye parallax image and the left-eye parallax image. Also, the relative luminous intensity $I/I_0$ is strong when the emitted angle θ2 is 0° to −30°.

Thus, the left-eye light distribution and the right-eye light distribution of the single-face-deformed triangular prism sheet 3' is symmetrical with respect to θ2=0°.

In the above-described embodiment, the width of the flat mirror finishing portions 11 is definite; however, the width of the flat mirror finishing portions 11 can be changed. Even in this case, the light guide plate 1 is symmetrical with respect to a center face between the light incident faces $S_{ina}$ and $S_{inb}$.

Also, the single-face-deformed triangular prism sheet 3' is made of a single material; however, the single-face-deformed triangular prism sheet 3' can be made of two or more different materials stacked on each other. Further, the single-face-deformed triangular prism sheet 3' can be a two-step or four-step triangular prism.

Figure 9:
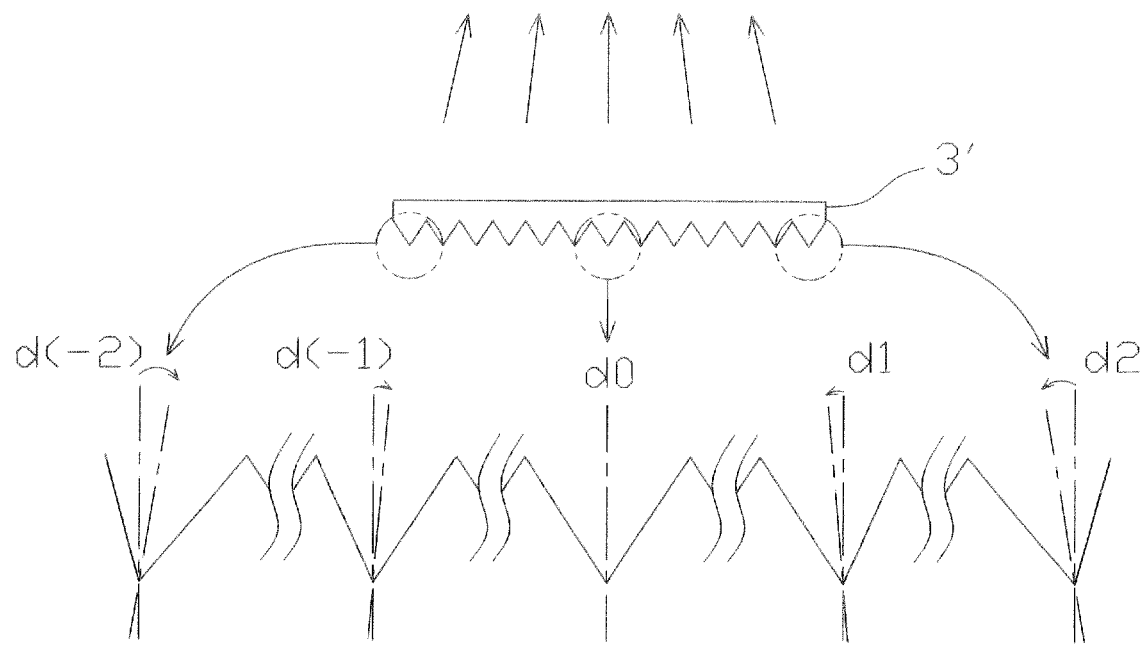
FIG. 9 is a view illustrating a first example of the single-face-deformed triangular prism sheet of FIG. 1B.

In FIG. 9, which illustrates a first example of the single-face-deformed triangular prism sheet 3' of FIG. 1B, in order to display a stereoscopic image at the center of the display image of the apparatus 10" when the viewer 20 is located in front of the center of the display image of the apparatus 10", angles d(−2), d(−1), d0, d1 and d2 for apexes of prisms are changed with respect to normal lines of their long edges. In this case, the angle d0 at the center of the display image is 0°, the negative side angles d(−1) and d(−2) are gradually increased, and also the positive side angles d1 and d2 are gradually increased. That is, $d(-2) > d(-1) > d0$, or $d0 < d1 < d2$.

Note that the amounts at change of the angles d(−2), d(−1), d0, d1 and d2 are not always the same. Thus, when no drive voltage $V_d$ is applied to the optically-modulating structure 7, a stereoscopic image is displayed at the center of the display image. When this stereoscopic image is required to be displayed at a left or right side of the display image, a drive voltage $V_d$ is applied to the optically-modulating structure 7. In this case, the stereoscopic image can be moved by the optically-modulating structure 7 either toward the left direction or toward the right direction with respect to the center of the display image. Therefore, the stereoscopic image can be displayed at the center and at the left or right side of the display image.

Figure 10:
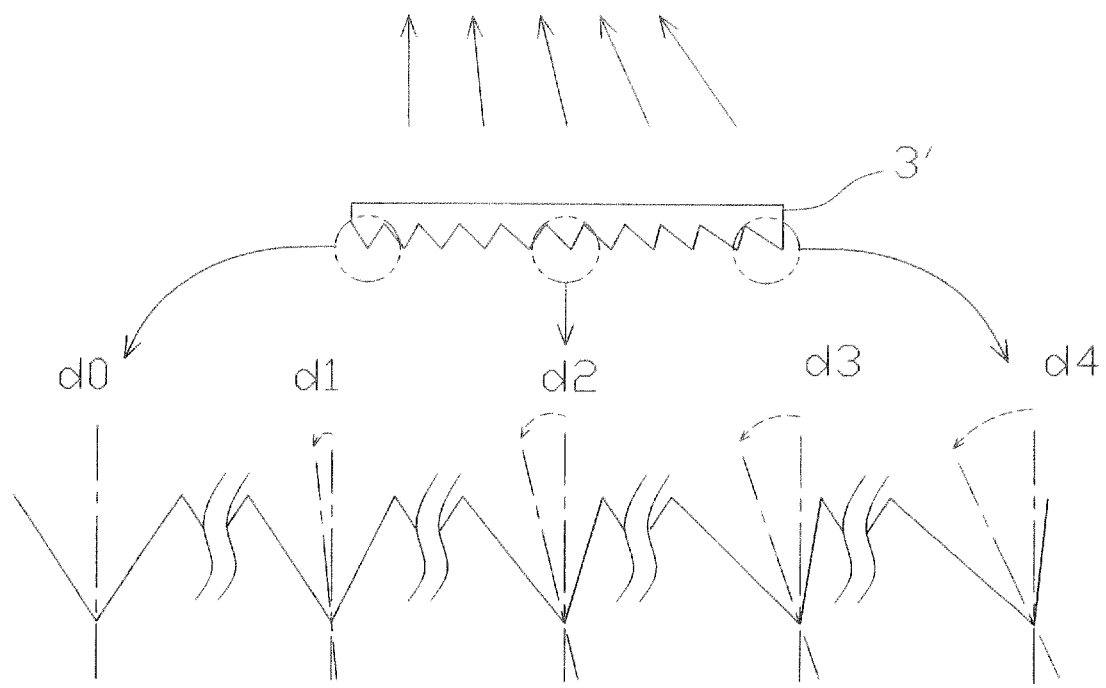
FIG. 10 is a view illustrating a second example of the single-face-deformed triangular prism sheet of FIG. 1B.

In FIG. 10, which illustrates a second example of the single-face-deformed triangular prism sheet 3' of FIG. 1B, in order to display a stereoscopic image at the left side of the display image of the apparatus 10" when the viewer 20 is located at the left side of the display image of the apparatus 10", angles d0, d1, d2, d3 and d4 for apexes of prisms are changed with respect to normal lines of their long edges. In this case, the angle d0 at the left side of the display image is 0°, and the angles d1, d2, d3 and d4 are gradually increased. That is, $d0 < d1 < d2 < d3 < d4$.

Note that the amounts of change of the angles d0, d1, d2, d3 and d4 are not always the same. Thus, when no drive voltage $V_d$ is applied to the optically-modulating structure 7, a stereoscopic image is displayed at the left side of the display image. When this stereoscopic image is required to be displayed at the center or at a right side of the display image, a drive voltage $V_d$ is applied to the optically-modulating structure 7. In this case, the stereoscopic image can be moved by the optically-modulating structure 7 toward the right direction with respect to the left side of the display image. Therefore, the stereoscopic image can be displayed at the center and at the left and right sides of the display image. For example, when the maximum drive voltage $V_d$ is applied to the optically-modulating structure 7, it is assumed that the optically-modulating structure 7 is inclined at 20°. In this case, the outgoing angle of the single-face-deformed triangular prism sheet 3' is caused to be −10°.

The optically-modulating structure 7 of FIG. 1B will be explained next with reference to FIGS. 11A, 11B, 11C, 12A and 12B.

Figure 11A:
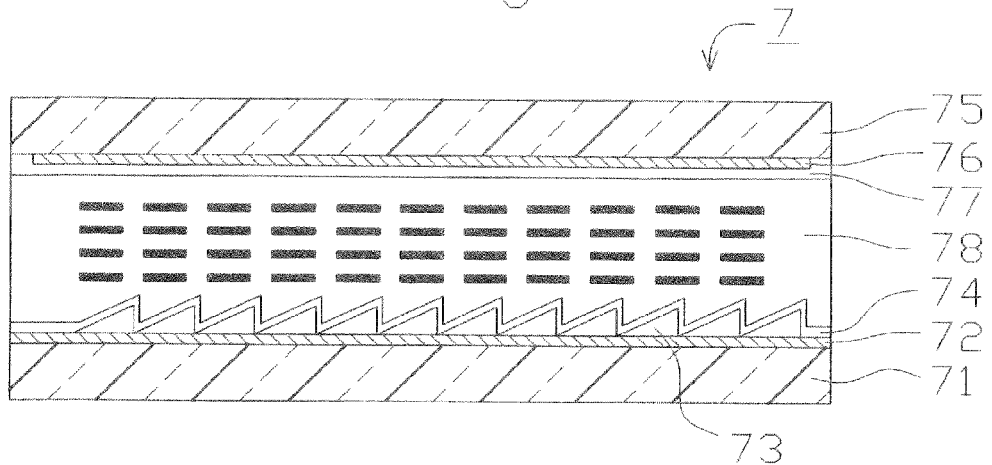
FIGS. 11A, 11B and 11C are cross-sectional views of the optically-modulating structure of FIG. 1B.

In FIG. 11A, formed on a transparent substrate 71 made of glass or plastic is a transparent electrode layer 72 made of indium tin oxide (ITO). Then, a prism array 73 is formed on the transparent electrode layer 72. The prism array 73 will be discussed later. An alignment layer 74 is formed on the prism array 73. Note that the transparent electrode layer 72 is patterned, as occasion demands. On the other hand, formed on a transparent substrate 75 made of glass or plastic is a transparent electrode layer 76 made of ITO. Then, an alignment layer 77 is formed on the transparent electrode layer 76. Note that the transparent electrode layer 76 is also patterned, as occasion demands.

Dispersed between the side of the transparent substrate 71 and the side of the transparent substrate 75 are a large number of granular spacers to maintain the distance between the transparent substrates 71 and 75 where a liquid crystal layer 78 is injected.

The alignment layers 74 and 77 define the alignment state of liquid crystal molecules of the liquid crystal layer 78 in a horizontal alignment state with no voltage applied. Note that a rubbing aligning process or an ultraviolet ray aligning process is performed upon the alignment layers 74 and 77.

The liquid crystal layer 78 is made of a nematic liquid crystal material with a positive dielectric anisotropy Δ∈(Δ∈>0). Thick lines within the liquid crystal layer 78 designate liquid crystal molecules, where a predetermined pretilt angle is allocated with respect to the transparent substrates 71 and 75 so that the liquid crystal modules in the liquid crystal layer 78 are tilted a little from a horizontal angle with respect to the transparent substrates 71 and 75 while applying no voltage thereto.

Figure 11B:
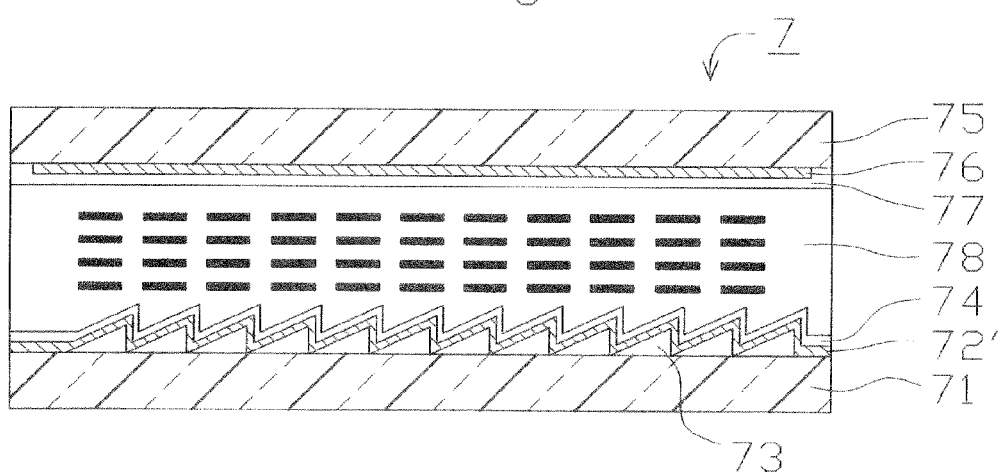

The optically-modulating structure 7 of FIG. 11B is the same as the optically-modulating structure 7 of FIG. 11A, except that a transparent electrode layer 72' is formed on the prism array 73. Therefore, although the electric field strength applied to the liquid crystal layer 78 is different from that in FIG. 11A, the operation of the optically-modulating structure 7 of FIG. 11B is the same as that of the optically-modulating structure 7 of FIG. 11A.

Figure 11C:
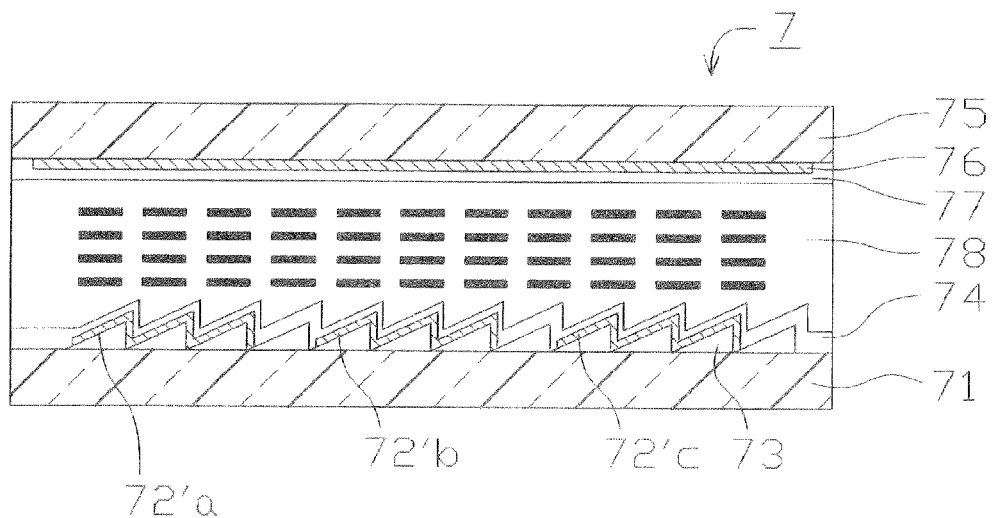

The optically-modulating structure 7 of FIG. 11C is the same as the optically-modulating structure 7 of FIG. 11B, except that a transparent electrode layer 72' of FIG. 11B is divided into a plurality of striped transparent electrode layers 72'a, 72'b and 72'c. As a result, a plurality of different voltage-applied states can be established in areas defined by the striped transparent electrode layers 72'a, 72'b and 72'c.

In FIGS. 11A, 11B and 11C, the drive voltage $V_d$ applied to the liquid crystal layer 78 is sufficiently low, for example, several volts. In this case, since the transparent electrode layers 72', 72'a, 72'b and 72'c of FIGS. 11B and 11C are located on the prism array 73, the drive voltage $V_d$ in FIGS. 11B and 11C can be lower than the drive voltage $V_d$ in FIG. 11A. Also, the cell thickness of the liquid crystal layer 78 depends upon the location of the prism array 73; however, if an antiparallel alignment process is performed upon the alignment layers 74 and 77, the threshold value of the drive voltage $V_d$ is hardly dependent upon the cell thickness of the liquid crystal layer 78, so that no difference is found in refractive index change at an interface between the prism array 73 and the liquid crystal layer 78. Also, the optically-modulating structure 7 does not need polarizers which would be used in conventional liquid crystal elements, and therefore, the optically-modulating structure 7 has a high transmissivity in principle. Concretely, the transmissivity of the optically-modulating structure 7 can be expected to be higher than 90%, and, if an anti-reflective coating is performed upon the optically-modulating structure 7, the above-mentioned transmissivity can be expected to be higher than 95%. Note that, the above-mentioned alignment process can be a twisted alignment process.

Figure 12A:
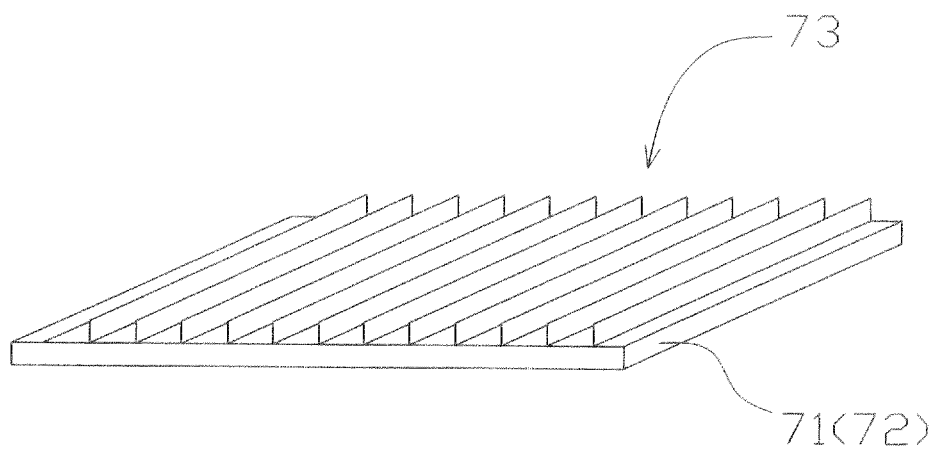
FIG. 12A is a perspective view of the prism array of FIGS. 11A, 11B and 11C.

FIG. 12A is a perspective view of the prism array 73 of FIGS. 11A, 11B and 11C, and FIG. 12B is a partially-cross-sectional view of the prism array 73 of FIG. 12A.

As illustrated in FIG. 12A, the prism array 73 is formed by a plurality of sloped/protruded prisms arranged along one direction. The prism array 73 is slit-shaped viewed from the up direction. Also, the prism array 73 is made of heat-resistant resin excellently in contact characteristics.

Figure 12B:
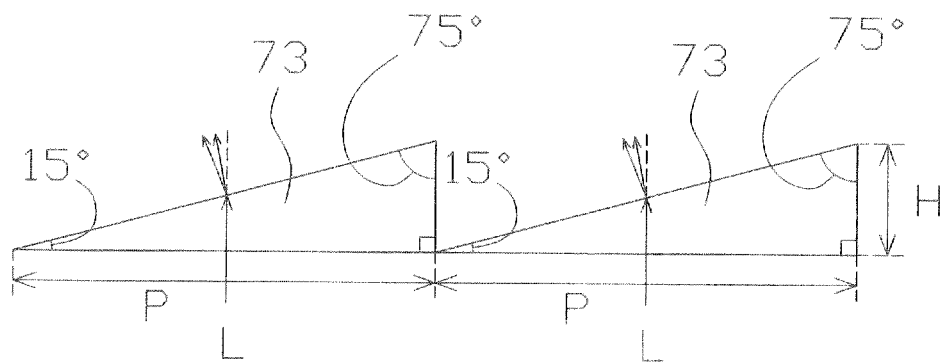
FIG. 12B is a partially-cross-sectional view of the prism array of FIG. 12A.

As illustrated in FIG. 12B, each of the prisms has a right-angle triangular cross section with an apical angle of 75° and basic angles of 15° and 90°, and the prisms have a pitch P of about 20 μm and a height H of about 5.2 μm. Therefore, incident light L from the bottom of the prisms is refracted at the sloped face thereof depending upon the refractive index n of the liquid crystal layer 78 in accordance with Snell's law of refraction. At this time, the control circuit 6 of FIG. 1B applies the drive voltage $V_d$ between the transparent electrode layers 72 and 76. As a result, the columnar molecules of liquid crystal of the liquid crystal layer 78 are changed in accordance with the drive voltage $V_d$ to change the refractive index n of the liquid crystal layer 78, thus voluntarily changing the refractive angle of light at the prism array 73 (precisely, the alignment layer 74) and the liquid crystal layer 78. The refractive angle is about several degrees to 20 degrees depending upon the shape of the prisms of the prism array 73, the refractive index anisotropy of the liquid crystal layer 78 and the like.

In FIGS. 11A, 11B and 11C, the response speed of liquid crystal cells of the liquid crystal layer 78 is dependent upon the cell thickness of the liquid crystal layer 78, and would be in proportion to the square value of the cell thickness. Also, since the cell thickness of the liquid crystal layer 78 depends upon the location of the prism array 73, the response speed of the liquid crystal molecules depends upon the location of the prism array 73. Therefore, when the drive voltage $V_d$ is changed at the response speed of liquid crystal molecules at the maximum cell thickness, the display location of a stereoscopic image would be subtly shifted. If positive use is made of the shift, the display of the stereoscopic image seems to be flickering like heat-waves. Further, when the drive voltage $V_d$ is gradually increased or decreased, the display location of the stereoscopic image is continuously changed.

FIGS. 13A, 13B, 13C, 14A, 14B and 14C are graphs illustrating a left-eye light distribution and a right-eye light distribution of the optically-modulating structure 7 (the transmissive display panel 4) of FIG. 1B when the drive voltage $V_d$ is changed. Note that θ3 is defined as an emitted angle of light at the optically-modulating structure 7, i.e., at the transmissive display panel 4.

Figure 13A:
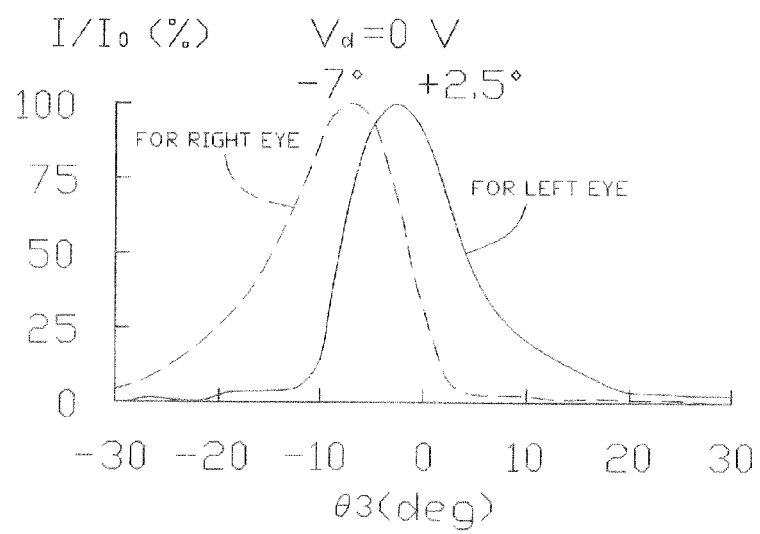
FIGS. 13A, 13B, 13C, 14A, 14B and 14C are graphs illustrating a left-eye light distribution and a right-eye light distribution of the optically-modulating structure (the transmissive display panel) of FIG. 1B when the drive voltage is changed.

First, when the drive voltage $V_d$ is 0V, the left-eye light distribution of the optically-modulating structure 7 is centered at θ3=+2.5°, and the right-eye light distribution of the optically-modulating structure 7 is centered at θ3=−7°, as illustrated in FIG. 13A.

Figure 13B:
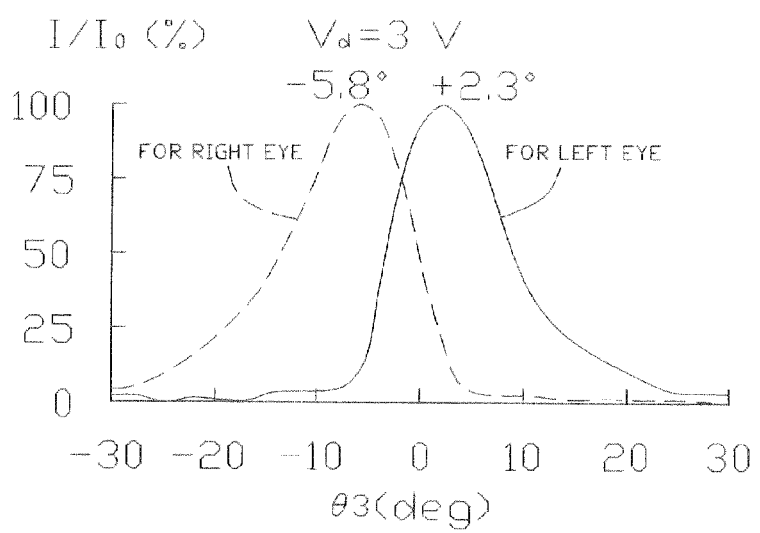

Next, when the drive voltage $V_d$ is increased to 3V, the left-eye light distribution of the optically-modulating structure 7 becomes centered at θ3=+2.3°, and the right-eye light distribution of the optically-modulating structure 7 becomes centered at θ3=−5.8°, as illustrated in FIG. 13B, thus shifting the display location of the stereoscopic image a little toward the left side.

Figure 13C:
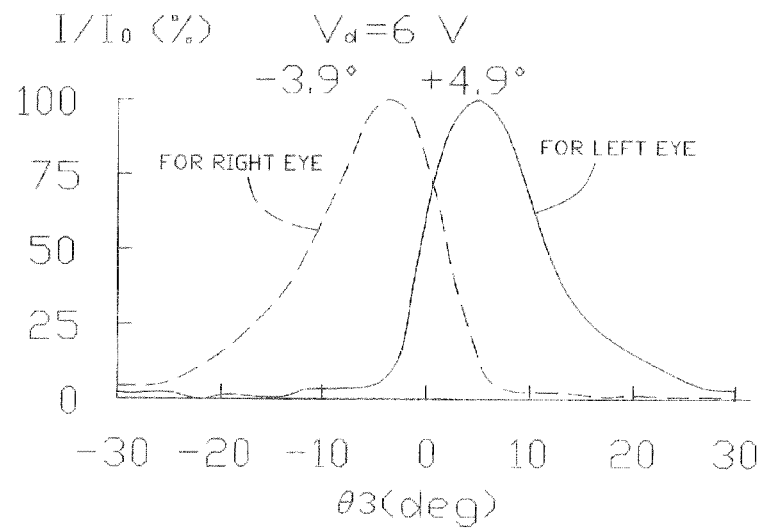

Next, when the drive voltage $V_d$ is increased to 6V, the left-eye light distribution of the optically-modulating structure 7 becomes centered at θ3=+4.9, and the right-eye light distribution of the optically-modulating structure 7 becomes centered at θ3=−3.9°, as illustrated in FIG. 13C, thus shifting the display location of the stereoscopic image a little toward the left side.

Figure 14A:
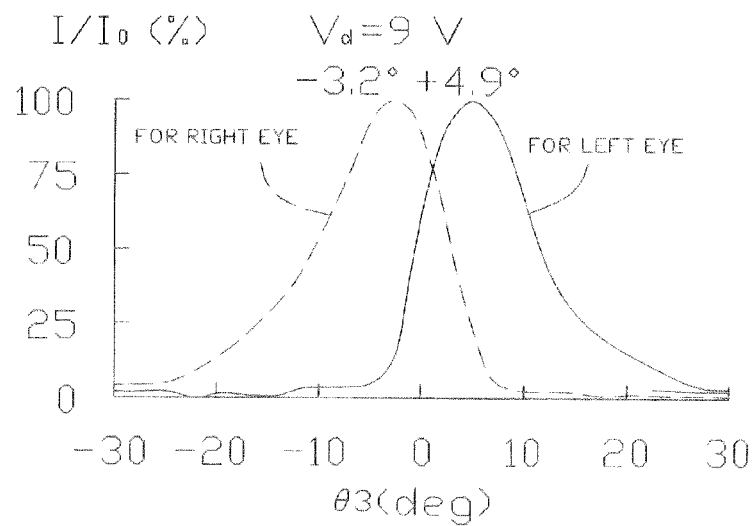

Next, when the drive voltage $V_d$ is increased to 9V, the left-eye light distribution of the optically-modulating structure 7 becomes centered at θ3=+4.9°, and the right-eye light distribution of the optically-modulating structure 7 becomes centered at θ3=−3.2°, as illustrated in FIG. 14A, thus shifting the display location of the stereoscopic image a little toward the left side.

Figure 14B:
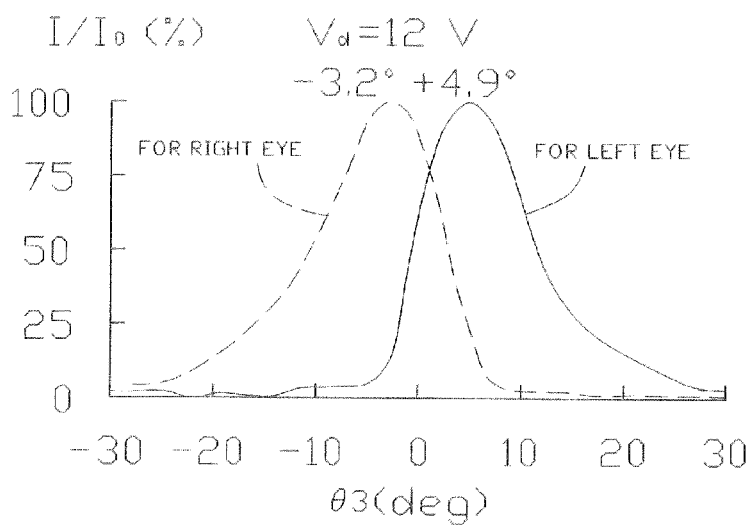
Figure 14C:
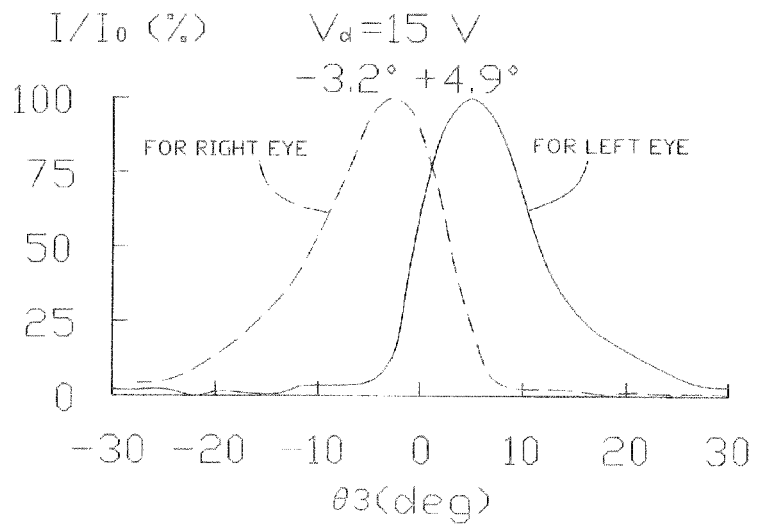

After that, even when the drive voltage $V_d$ is increased to 12V and 15V, the left-eye light distribution of the optically-modulating structure 7 is still centered at θ3=+4.9°, and the right-eye light distribution of the optically-modulating structure 7 is still centered at θ3=−3.2°, as illustrated in FIGS. 14B and 14C. Thus, the display location of the stereoscopic image is not shifted.

Thus, in accordance with the drive voltage $V_d$, the display location of a stereoscopic image can be moved toward the right side viewed from the front of the stereoscopic display apparatus 10", i.e., toward the left side viewed from the viewer 20. Therefore, when the control circuit 6 changes the drive voltage $V_d$ in accordance with the sense signal of the sensor 10a, the stereoscopic image can be moved toward an appropriate direction in accordance with the location of the viewer 20.

Figure 15:
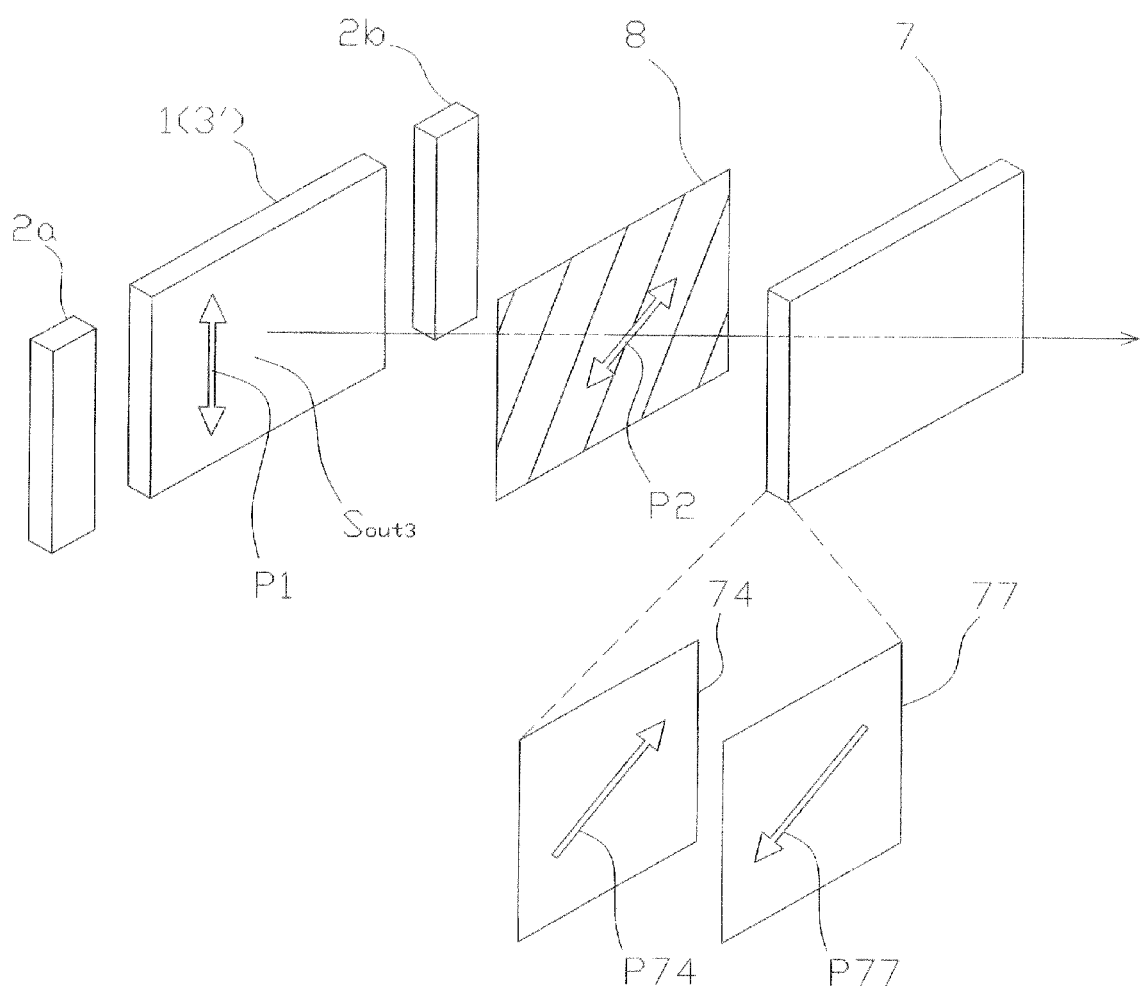
FIG. 15 is a view for explaining the operation of the phase difference plate of FIG. 1B.
Figure 17A:
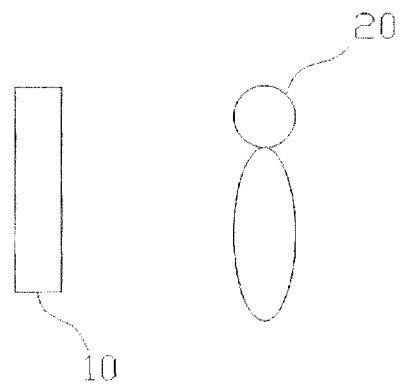
FIG. 17A is a schematic view illustrating a prior art non-spectacled stereoscopic display apparatus.
Figure 17B:
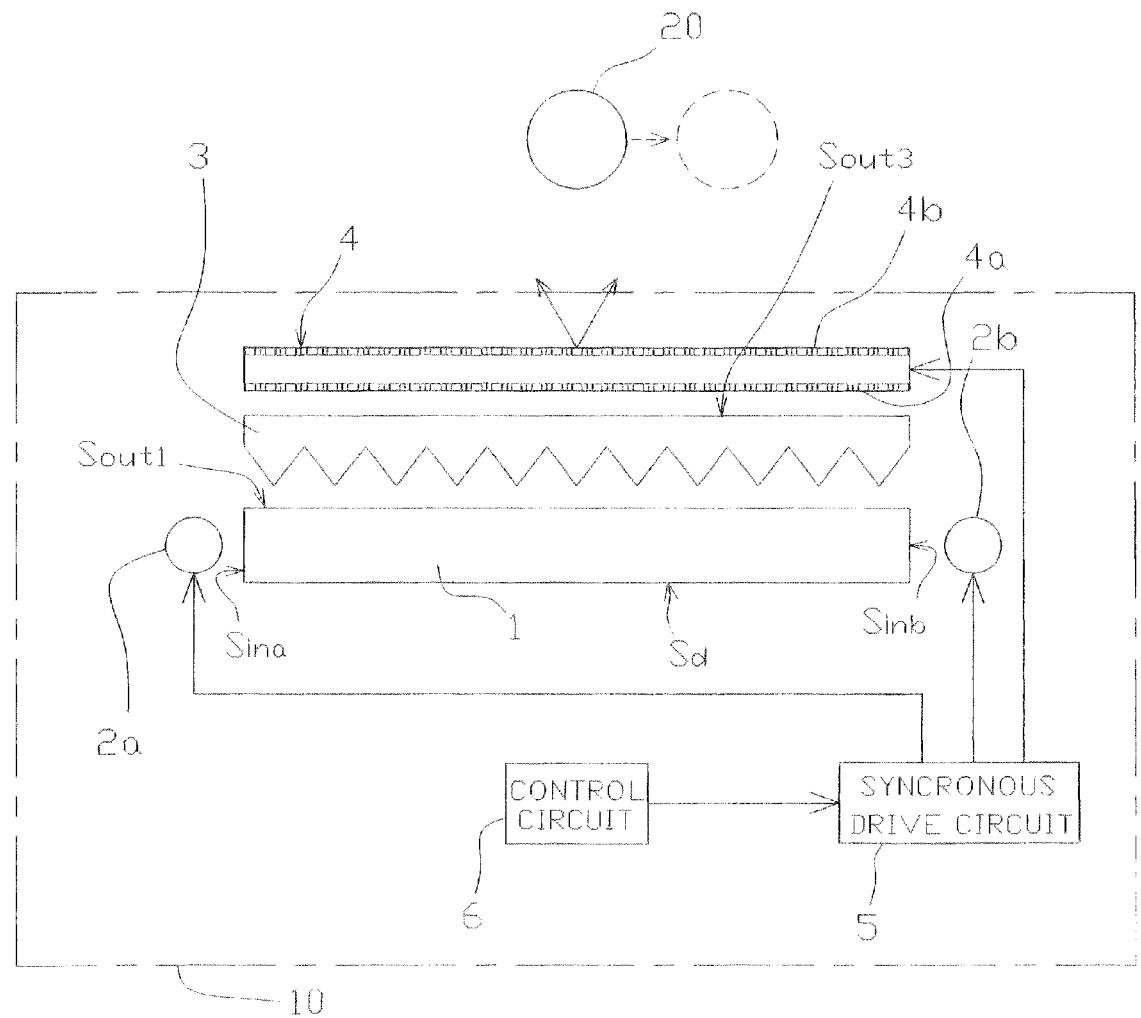
FIG. 17B is a detailed view of the stereoscopic display apparatus of FIG. 17A.

FIG. 15 is a view for explaining the operation of the phase difference plate 8 of FIG. 1B.

As illustrated in FIG. 15, since the long edges of the prisms are arranged in parallel with each other on the light emitting face $S_{out3}$ of the single-face-deformed triangular prism sheet 3', the main polarization direction P1 of the single-face-deformed triangular prism sheet 3' coincides with the direction of the long edges of the prisms of the single-face-deformed triangular prism sheet 3'. On the other hand, the antiparallel aligning directions P74 and P77 of the alignment layers 74 and 77 are about 45° with respect to the direction of the long edges of the prisms of the single-face-deformed triangular prism sheet 3'. Therefore, the main polarization direction P1 of the single-face-deformed triangular prism sheet 3' is rotated by 22.5° using the phase difference plate 8 which is, in this case, a half-wave length (λ/2) plate, the main polarization direction P2 of the phase difference plate 8 is 45° and coincides with the antiparallel aligning directions P74 and P77.

On the other hand, liquid crystal molecules of the liquid crystal layer 78 are conventionally columnar. Therefore, polarized light along the major axis of liquid crystal cells can be refracted, while polarized light along the minor axis of liquid crystal cells cannot be refracted.

Thus, all components of polarized light along the polarization direction P2 by the phase difference plate 8 can be refracted by the liquid crystal cells of the liquid crystal layer 78, thus enhancing utilization efficiency of light.

Note that, if an angle between the main polarization direction P1 of the single-face-deformed triangular prism sheet 3' and the antiparallel aligning directions P74 and P77 is given by α, the phase difference of the phase difference plate 8 is a α/2.

Also, as stated above, in FIG. 1B, the contact layer 9-1 is inserted between the single-face-deformed triangular prism sheet 3' and the phase difference plate 8, the contact layer 9-2 is inserted between the phase difference plate 8 and the optically-modulating structure 7, and the contact layer 9-3 is inserted between the optically-modulating structure 7 and the transmissive liquid crystal display panel 4. The contact layers 9-1, 9-2 and 9-3 are constructed by a base layer made of polyethylene telephthalate (PET) and adhesive layers made of silicone resin, polyethylene resin or acrylic resin on both faces of the base layer. The materials of the contact layers 9-1, 9-2 and 9-3 are selected so that the difference in refractive index between the single-face-deformed triangular prism sheet 3' and the phase difference plate 8 and the like can become small, thus suppressing generation of returning light due to the total-reflection. Note that, returning light would cause crosstalk. For example, if the single-face-deformed triangular prism sheet 3' is made of PET, the base layer of the contact layers 9-1, 9-2 and 9-3 is made of PET.

Note that the contact layers 9-1, 9-2 and 9-3 can be made of only adhesive material such as silicone resin, polyethylene resin or acrylic resin.

FIG. 16A is a schematic view illustrating a modification of the non-spectacled stereoscopic display apparatus of FIG. 1A, and FIG. 16B is a detailed view of the stereoscopic display apparatus of FIG. 16A.

In FIG. 16A, the non-spectacled stereoscopic display apparatus 10" of FIG. 1A is replaced by a non-spectacled stereoscopic display apparatus 10''' where the phase difference plate 8 and the optically-modulating structure 7 are provided on the light emitting side of the transmissive liquid crystal display panel 4 as illustrated in FIG. 16B. Even in this case, the phase difference of the phase difference plate 8 is determined so that the prism main polarization direction of the single-face-deformed triangular prism sheet 3' coincides with the antiparallel aligning direction of the optically-modulating structure 7.

Even in the above-described embodiment, two light guide plates, i.e., a lower light guide plate and an upper light guide plate superposed onto the lower light guide plate can be provided instead of the light guide plate 1 (see: JP2010-286813A).

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background portion of the present specification are hereby incorporated in their entirety by reference.

The invention claimed is:

1. A non-spectacled stereoscopic display apparatus comprising:
a light guide plate having a light distributing face, a light emitting face opposing said light distributing face, and first and second light incident faces opposing each other on sides of said light distributing face and said light emitting face;
first and second light sources disposed on the first and second light incident faces, respectively, of said light guide plate;
a single-face prism sheet including prisms arranged along one direction disposed on the light emitting face of said light guide plate;
a transmissive display panel disposed on a light emitting face of said single-face prism sheet;
a synchronous drive circuit adapted to synchronize said first and second light sources to display parallax images on said transmissive display panel;
a phase difference plate; and
an optically-modulating structure adapted to receive light emitted from said phase difference plate,
said optically-modulating structure comprising:
first and second transparent substrates opposing each other;
a prism array provided on said first transparent substrate;
a first transparent electrode layer provided on said prism array;
a second transparent electrode layer provided on said second transparent substrate;
a liquid crystal layer provided between said first and second transparent substrates; and
first and second alignment layers provided on said first and second transparent substrates, respectively, for performing an aligning process upon liquid crystal molecules of said liquid crystal layer,
said phase difference plate adapted to rotate a main polarization angle of said single-face prism sheet by a predetermined angle to coincide with an aligning direction of said liquid crystal layer.

2. The non-spectacled stereoscopic display apparatus as set forth in claim 1, wherein said phase difference plate and said optically-modulating structure are disposed between said single-face prism sheet and said transmissive liquid crystal display panel.

3. The non-spectacled stereoscopic display apparatus as set forth in claim 1, wherein said phase difference plate and said optically-modulating structure are disposed on a light emitting side of said single-face prism sheet.

4. The non-spectacled stereoscopic display apparatus as set forth in claim 1, wherein angles for apexes of the prisms of said single-face prism sheet are changed with respect to normal lines of long edges of the prisms.

5. The non-spectacled stereoscopic display apparatus as set forth in claim 4, wherein one of said angles at a center of a display image is 0° and the others of said angles are gradually increased toward sides of said display image.

6. The non-spectacled stereoscopic display apparatus as set forth in claim 4, wherein one of said angles at one side of a display image is 0°, and the others of said angles are gradually increased toward the other side of said display image.

7. The non-spectacled stereoscopic display apparatus as set forth in claim 1, further comprising contact layers disposed among said single-face prism sheet, said phase difference plate and said transmissive display panel.

8. The non-spectacled stereoscopic display apparatus as set forth in claim 7, wherein each of said contact layers comprises:
   a base; and
   an adhesive layer coated on said base.

9. The non-spectacled stereoscopic display apparatus as set forth in claim 7, wherein each of said contact layers comprises an adhesive layer.

* * * * *